United States Patent
Backer et al.

(10) Patent No.: US 9,043,268 B2
(45) Date of Patent: May 26, 2015

(54) METHOD AND SYSTEM FOR DISPLAYING LINKS TO SEARCH RESULTS WITH CORRESPONDING IMAGES

(75) Inventors: Alejandro Backer, Altadena, CA (US); Marzia Polito, Burbank, CA (US)

(73) Assignee: AB INVENTIO, LLC, Altadena, CA (US)

( * ) Notice: Subject to any disclaimer, the term of this patent is extended or adjusted under 35 U.S.C. 154(b) by 1099 days.

(21) Appl. No.: 12/044,866

(22) Filed: Mar. 7, 2008

(65) Prior Publication Data

US 2008/0222143 A1    Sep. 11, 2008

Related U.S. Application Data

(60) Provisional application No. 60/893,644, filed on Mar. 8, 2007.

(51) Int. Cl.
| | | |
|---|---|---|
| *G06F 17/30* | (2006.01) | |
| *G06F 7/00* | (2006.01) | |
| *G06F 17/00* | (2006.01) | |
| *G06Q 40/02* | (2012.01) | |
| *G06Q 40/00* | (2012.01) | |

(52) U.S. Cl.
CPC .......... *G06Q 40/02* (2013.01); *G06F 17/30259* (2013.01); *G06Q 40/00* (2013.01)

(58) Field of Classification Search
CPC ... G06F 17/30259; G06Q 40/00; G06Q 40/02
USPC ........................................................ 707/706
See application file for complete search history.

(56) References Cited

U.S. PATENT DOCUMENTS

| | | | |
|---|---|---|---|
| 6,167,398 A | 12/2000 | Wyard et al. | 707/5 |
| 7,003,506 B1 | 2/2006 | Fisk et al. | 707/1 |
| 7,069,308 B2 | 6/2006 | Abrams | 709/218 |
| 7,099,860 B1 * | 8/2006 | Liu et al. | 1/1 |
| 7,187,932 B1 | 3/2007 | Barchi et al. | 455/445 |
| 7,647,300 B2 * | 1/2010 | Nevill-Manning et al. | 705/26 |
| 7,765,178 B1 | 7/2010 | Roizen et al. | |
| 7,801,885 B1 | 9/2010 | Verma | |
| 8,015,183 B2 | 9/2011 | Frank | |

(Continued)

OTHER PUBLICATIONS

Hyvonen et al, "Ontology-Based Image Retrieval", 2002.*

(Continued)

*Primary Examiner* — Brannon W Smith
(74) *Attorney, Agent, or Firm* — Steinfl & Bruno LLP

(57) ABSTRACT

Methods and systems for displaying search engine results where the file links are displayed with corresponding images of things that fall within a given category are disclosed. Object detection software can be used with a search engine to provide search results to a user that contain specific images found within the result pages (i.e. the pages of the websites returned as the results). For a given class of objects, the user can be presented with images that contain that class of object along with the result hyperlinks, allowing the user to make a more informed choice as to which hyperlink is the most appropriate search result, without being inundated with all of image files present in the result pages. For example, a search engine geared toward searching on the Internet for information about people could be augmented to show images of the people associated with each of the page results, allowing the user to see the faces of the people described in the pages before selecting the hyperlinks and visiting those pages.

16 Claims, 3 Drawing Sheets

(56) References Cited

U.S. PATENT DOCUMENTS

| | | | |
|---|---|---|---|
| 2002/0038299 A1 | 3/2002 | Zernik | 707/3 |
| 2002/0099720 A1 | 7/2002 | Bansal | 707/104.1 |
| 2005/0055379 A1* | 3/2005 | Yamazaki et al. | 707/104.1 |
| 2005/0076003 A1 | 4/2005 | DuBose et al. | 707/1 |
| 2005/0131894 A1* | 6/2005 | Vuong | 707/5 |
| 2005/0171936 A1 | 8/2005 | Zhu | 707/3 |
| 2005/0192940 A1* | 9/2005 | Morris | 707/3 |
| 2005/0223031 A1* | 10/2005 | Zisserman et al. | 707/104.1 |
| 2006/0002607 A1* | 1/2006 | Boncyk et al. | 382/165 |
| 2006/0069681 A1* | 3/2006 | Lauper | 707/6 |
| 2006/0106767 A1 | 5/2006 | Adcock et al. | 707/3 |
| 2006/0177808 A1 | 8/2006 | Aosawa et al. | 434/322 |
| 2006/0251292 A1* | 11/2006 | Gokturk et al. | 382/103 |
| 2007/0172155 A1* | 7/2007 | Guckenberger | 382/305 |
| 2008/0080745 A1* | 4/2008 | Vanhoucke et al. | 382/118 |

OTHER PUBLICATIONS

Paul Viola and Michael Jones "Robust real-time Objection Detection," Second International Workshop on Statistical and Computational Theories of Vision—Modeling, Learning, Computing and Sampling; Vancouver, Canada, (Jul. 13, 2001).

Forsyth and Ponce "Computer Vision, A Modern Approach," Prentice Hall; ISBN-10: 0130851981; ISBN-13: 978-0130851987 (2002).

Restriction Requirement issued by USPTO for U.S. Appl. No. 12/044,871 dated Feb. 15, 2011.

Office Action issued by USPTO for U.S. Appl. No. 12/044,871 dated Jun. 25, 2010.

Office Action mailed on May 24, 2011 for U.S. Appl. No. 12/044,871, filed Mar. 7, 2008 in the name of California Institute of Technology.

Office Action mailed on Sep. 12, 2013 for U.S. Appl. No. 12/044,871, filed Mar. 7, 2008 in the name of Alejandro Backer et al.

* cited by examiner

METHOD AND SYSTEM FOR DISPLAYING LINKS TO SEARCH RESULTS WITH CORRESPONDING IMAGES

CROSS REFERENCE TO RELATED APPLICATIONS

This application claims benefit to U.S. provisional application 60/893,644 filed on Mar. 8, 2007, for "Various" by Alejandro Backer, the disclosure of which is incorporated herein by reference in its entirety. The present application is also related to "Search Engine Refinement Method and System" by Alejandro Backer et al., Ser. No. 12/044,871 filed on even date herewith, which is also incorporated herein by reference in its entirety.

FIELD

The present writing is generally directed to network search engines, specifically, to search engines directed to searching for information about a particular class of objects, including information about people, where the search engine returns images as well as text to the user.

DESCRIPTION OF THE RELATED ART

The Internet is a network containing billions of files of information. Search engines have made it possible for people, even people with little technical background, to find the information they want from those files. Upon entering one or more keywords into a search engine, the search engine returns all of the files it has found that it deems relevant to the keywords. The relevance can be determined in many ways, but the most basic formula is to count the number of times the keywords appear in the text of a file. The more occurrences of the key words found, the more relevant the file is deemed to be. Modern search engines are more sophisticated than that example, but the basic principle is the same.

Many search engines offer the user the possibility of choosing a specific category of media (such as text, video, images), and only the files belonging to that category will be returned as results. In some occasions, a mixed-media result composed of, for example, text and image, is returned. However, the search engine selects the results merely using the text associated with the files, whether the content of the result is exclusively text or not. For example, the caption of a picture is used to identify the content of the picture. No further visual analysis of the actual content of the picture itself is performed, and no identification of the category of objects to which the picture could belong is made. For example, a query about Paris in Google Images would return pictures of monuments in the city of Paris, maps of the city itself, as well as portraits of the model Paris Hilton.

Object recognition software is software that can recognize objects pictured in an image file. Typically, the recognition is performed by pattern recognition techniques. One of the simplest forms of object recognition, object detection, is specialized to only recognize the difference between images that contain an object within a predefined class of objects (such as "people" or "planes") and images that do not contain objects in that class. A survey of the state of the art methods in the field of object detection is offered in the book by Forsyth and Ponce: "Computer Vision, A Modern Approach" (Publisher: Prentice Hall, 2002; ISBN-10: 0130851981; ISBN-13: 978-0130851987).

SUMMARY

The present disclosure concerns a system and method for displaying search engine results with corresponding images of objects, within a predetermined class of objects, identified in the results. The search begins with the entry of keywords (note: the term "keywords" in this disclosure and in the claims is not limited to individual words . . . a phrase can be a "keyword") into a search engine interface, for example, a webpage. The search engine has a set class of objects that the search falls under—either pre-set in the engine or separately selected by the user. When the class of objects being searched is "people", the best results occur when the person's name is entered as a keyword. Therefore, a search engine specializing in searching for people might have an interface that requests that information specifically.

The search engine then searches for files on the network that contain information related to the keywords entered. The searching could be performed by searching an index that was previously prepared by web crawling.

The search engine then displays links to the files found to the user. The links typically include title and/or summary text from the files, so as to identify the links from each other and give an impression of the contents of the file associated with each link. Many of these files may also contain images, typically using a reference tag such as the hypertext tag <img>. The search engine additionally retrieves those images and uses object recognition software to determine which of those images are images of the class of objects being searched for. A "class of objects" is any categorical noun grouping, for example "people", "cars", "terrain", or "food"; and includes narrow groups, for example "baseball players", "1950's hotrods", "mountains", or "hotdogs". For example, if the search was for a person (object class of "people"), then it is likely that any image of a person found in a file that was deemed relevant to the search is of that person. For example, a search for "Bob Smith" might return various links to files to various "Bob Smith"s, and some of those links will be to files that have pictures of the "Bob Smith" to which that file refers. Likewise, if the search is for a car (object class of "automobile"), then entering the keyword "Ford Mustang" would return various links to files dealing with various "Ford Mustang"s and some of those files would contain images of the "Ford Mustang" to which the file refers. The accuracy of the images determined to be relevant depends strongly on the quality of the image recognition software. Image recognition is still in its early stages (as of this writing), so there will likely be occurrences of false negatives (images not selected that depict an object in the class) and false positives (images selected that do not depict an object in the class). For example, if the class of objects is "automobiles," the image detection software might have difficulty detecting a photograph of a car taken from an unusual angle. Likewise, a picture of a cloud roughly shaped like a car might be considered "in the class" by some versions of software. However, a few false results does not negate the utility of this process, as there will typically be enough positive results available to enhance the user's ability to find correct files.

The search engine then displays both the links to the files and the images of the objects found in those files such that each link is clearly associated with the images it contains. In that way, it is possible to determine what is the correct link to follow based on the image (picture of the person, car, etc.) as well as the text.

A further embodiment sorts the links by relevance to the keywords entered, such that the most relevant links are presented first.

A yet further embodiment includes presenting links to pages in information specialized websites—such as wikis, social networks, professional networks, news websites, blogging websites, or online directories/encyclopedias—where the people identified as being relevant to the search keywords are listed by the information in the specialized website and the search is for people. A wiki (also known as a collaborative website) is an information database accessible by the world wide web and editable by anyone who has access to it. A social network is a social structure made of individuals that are tied by one or more specific types of relations, such as values, visions, idea, financial exchange, friends, kinship, dislike, conflict, trade, or, as commonly found in Internet social networks, just the idea of forming a social network. More information regarding the concept of social networking on the Internet can be found in U.S. Pat. No. 7,069,308 to Abrams ("System, method and apparatus for connecting users in an online computer system based on their relationships within social networks"), the contents of which are hereby incorporated by reference. Blogging sites (or web logging sites) are websites where members present for public view information in a diary or daily update format. For an embodiment that searches for people, the sites can be selected by matching the search keywords to the member of the site, a contributor to the site, or a person mentioned on the site. If the embodiment searches for an object that is not a person, then the sites selected will be the ones that discuss the object. For example, a search engine for cars might select sites such as car dealerships webpages, auto discussion forums, automobile comparison reports, and automotive safety ratings sites.

Another further embodiment enables the user to enter the keywords as a text message from a cellular device and view the resulting text, links, and/or images on that device. The system of this embodiment may perform this by converting a Short Messaging Service (SMS) message into an HTML form request by way of an intermediate conversion engine. Alternatively, the intermediate engine may convert the search results into a messaging system message, such as SMS or Multimedia Messaging Service (MMS), to the cellular device by resizing and repositioning the text and images to appear on a smaller screen.

According to a first aspect of this disclosure, a method for displaying to a user links to files on a network is described, comprising: collecting at least one keyword related to information being sought from the user; searching the network for at least one file containing information related to the at least one keyword; if a file of said at least one file contains at least one graphical image, determining, by way of an object recognition engine, which of said at least one graphical image is an image of an object within a class of objects; displaying a link corresponding to each of at least one file to the user; an displaying said at least one graphical image to the user in conjunction with the link corresponding to the file that contains said at least one graphical image.

According to a second aspect a method for displaying to a user links to files on a network is described as in the first aspect, wherein said object is a person and said class of objects is people.

According to a third aspect a method for displaying to a user links to files on a network is described as in the second aspect, further comprising: determining at least one identification of people referred to in the at least one file containing information related to the at least one keyword; using the at least one identification to search the network for at least one information specialized website that refers to said people referred to; and displaying to the user social network links to the at least one social network.

According to a fourth aspect a method for displaying to a user links to files on a network is described as in the third aspect, wherein the links to the at least one information specialized website are links to a member page in a social network, the member page being designated for one of said people referred to.

According to a fifth aspect a method for displaying to a user links to files on a network is described as in the first aspect, wherein: the user inputs the keywords via text messaging from a mobile telephonic device and all displaying is performed on said mobile telephonic device.

According to a sixth aspect a method for displaying to a user links to files on a network is described as in the first aspect, wherein the links to each of said at least one file are prioritized by relevance.

According to a seventh aspect a method for displaying to a user links to files on a network is described as in the first aspect, wherein said determining which of said at least one graphical image is an image of an object within a class of objects further includes analyzing the text of the markup language tag for said image.

According to a eighth aspect a method for displaying to a user links to files on a network is described as in the first aspect 1, wherein displaying links corresponding to each of at least one file to the user and displaying said at least one graphical image to the user includes placing said links and said at least one graphical image in a report file to be presented to the user.

According to a ninth aspect a method for displaying to a user links to files on a network is described as in the third aspect, wherein displaying links corresponding to each of at least one file to the user, displaying said at least one graphical image to the user, and displaying to the user social network links to the at least one social network includes placing said links corresponding to each of at least one file, said at least one graphical image, and said social network links in a report file to be presented to the user.

According to a tenth aspect of this disclosure, a World Wide Web enabled file or collection of files is described, wherein: when the file or collection of files is accessed by a Web browser, it displays search results, generated based on one or more keywords and a class of objects, the search results comprising: a plurality of information links corresponding to information specialized websites, wherein: an information link of said information links provides access to one or more pages that list pages that are within the information specialized website corresponding to said information link and that contain the one or more keywords; a plurality of web file links, wherein each of the plurality of web file links is a link to a website page that contains information related to the one or more keywords; one or more images that are of objects that are both related to the one or more keywords and are in the class of objects, wherein the images are contained in the website pages from the plurality of web file links and each image of the one or more images is displayed in conjunction with the web file link to the website page in which that image is contained.

According to a eleventh aspect of this disclosure, a World Wide Web enabled file or collection of files is described as in the tenth aspect, wherein the information specialized websites include social network websites.

According to a twelfth aspect of this disclosure, a system for displaying to a user links to files on a network is disclosed, comprising: a web server adapted for collecting at least one keyword from the user; a computer adapted for searching the network for at least one file containing information related to the at least one keyword; an object recognition engine, capable of determining if an image file referenced by the at least one file is an image of an object within a predetermined class of objects; and a computer and/or web server adapted for displaying text, links, and/or images related to each of said at least one file to the user.

According to a thirteenth aspect of this disclosure, a system for displaying to a user links to files on a network is disclosed as in the twelfth aspect, wherein the displaying text, links, and/or images related to relevant files in priority is performed by exclusively showing text, links, and/or images related to relevant files.

According to a fourteenth aspect of this disclosure, a system for displaying to a user links to files on a network is disclosed as in the twelfth aspect, wherein said computers and said web servers are incorporated as a single device.

According to a fifteenth aspect of this disclosure, a system for displaying to a user links to files on a network is disclosed as in the twelfth aspect, wherein the object recognition engine is an object detection engine.

Methods and systems for displaying search engine results where the file links are displayed with corresponding images of things that fall within a given category are disclosed. Object detection software can be used with a search engine to provide search results to a user that contain specific images found within the result pages (i.e. the pages of the websites returned as the results). For a given class of objects, the user can be presented with images that contain that class of object along with the result hyperlinks, allowing the user to make a more informed choice as to which hyperlink is the most appropriate search result, without being inundated with all of image files present in the result pages. For example, a search engine geared toward searching on the Internet for information about people could be augmented to show images of the people associated with each of the page results, allowing the user to see the faces of the people described in the pages before selecting the hyperlinks and visiting those pages.

DETAILED DESCRIPTION

Figure 1:
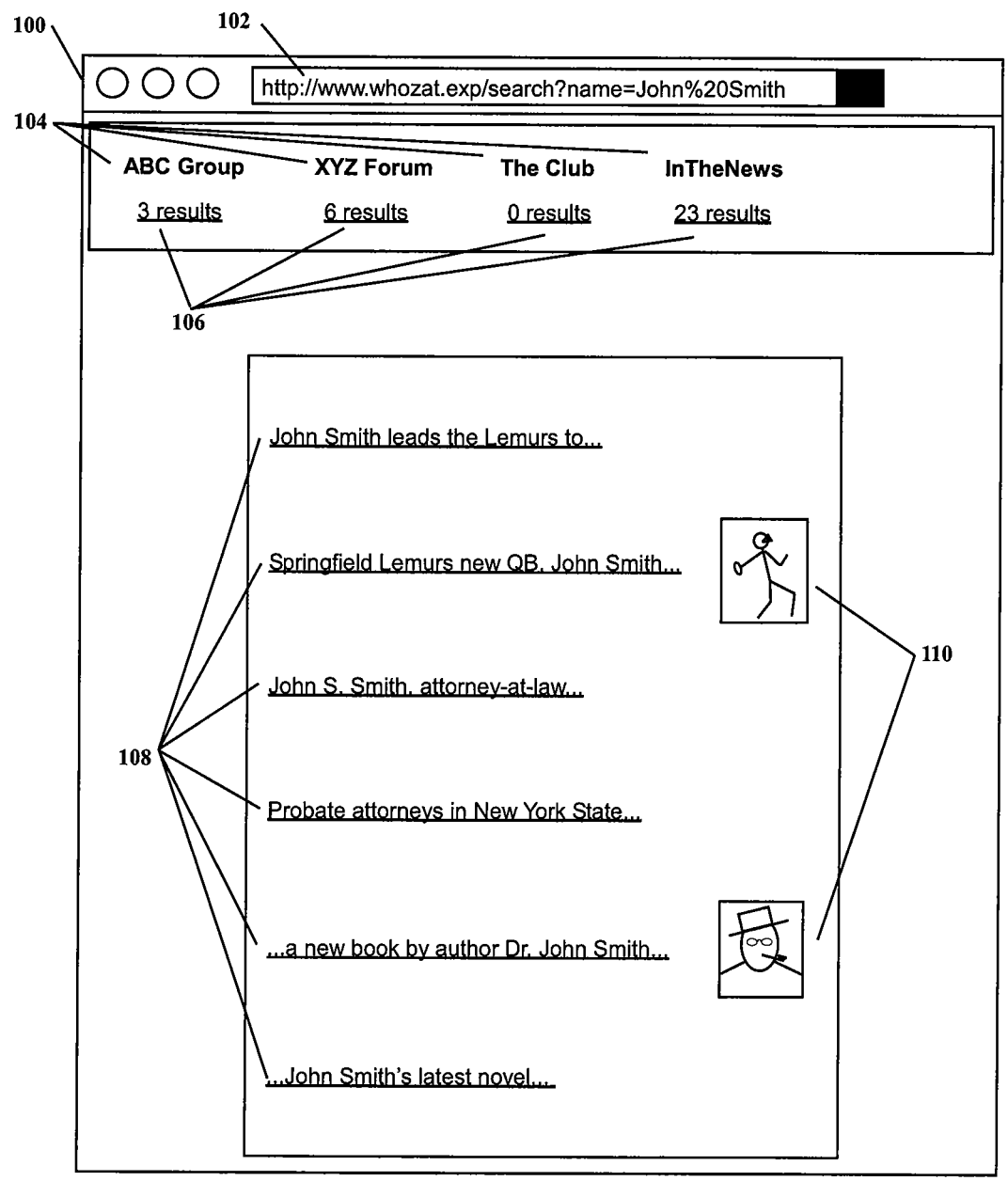
FIG. 1 depicts the displayed results of an example search where the class of object is people.

FIG. 1 depicts a webpage 100 displaying on a web browser the results of a search submitted to a search engine utilizing an embodiment of the disclosed method: specifically, an embodiment that searches for the class of objects of "people". The search can be entered into search fields provided at the top of the page or on a separate page, and the information is summarized in the Uniform Resource Locator ("URL") 102 presented at the top of the web browser. The example shown in FIG. 1 is a search for "John Smith." The search engine may display a number of social or professional networks, "blogs", or encyclopedia results 104 to which people can belong or be mentioned in. In conjunction with each network identifier 104, there is a link 106 to the results—the lists of member pages for the social network where the members match the name entered in the search 102. The choice of the displayed network result, and the ranking of the others, when many are present in the network can be based on the relevance of the result, where relevance is determined after having analyzed all the documents deemed relevant to the query, in the networks and in the entire web. There can also be a list of links to other webpage files 108 that the search engine has determined are relevant to the name entered in the search 102. The search engine determines if there are any images 110 within the webpages (identified by the links 108) that are of objects in the object class (in this case, people). This determining may be performed by object detection software, such as face detection software. The images 110 can be placed in conjunction with the webpage links 108 so that the user can use the images to help determine which specific links 108 would lead to the webpages most likely to have the information the user is searching for.

Figure 2:
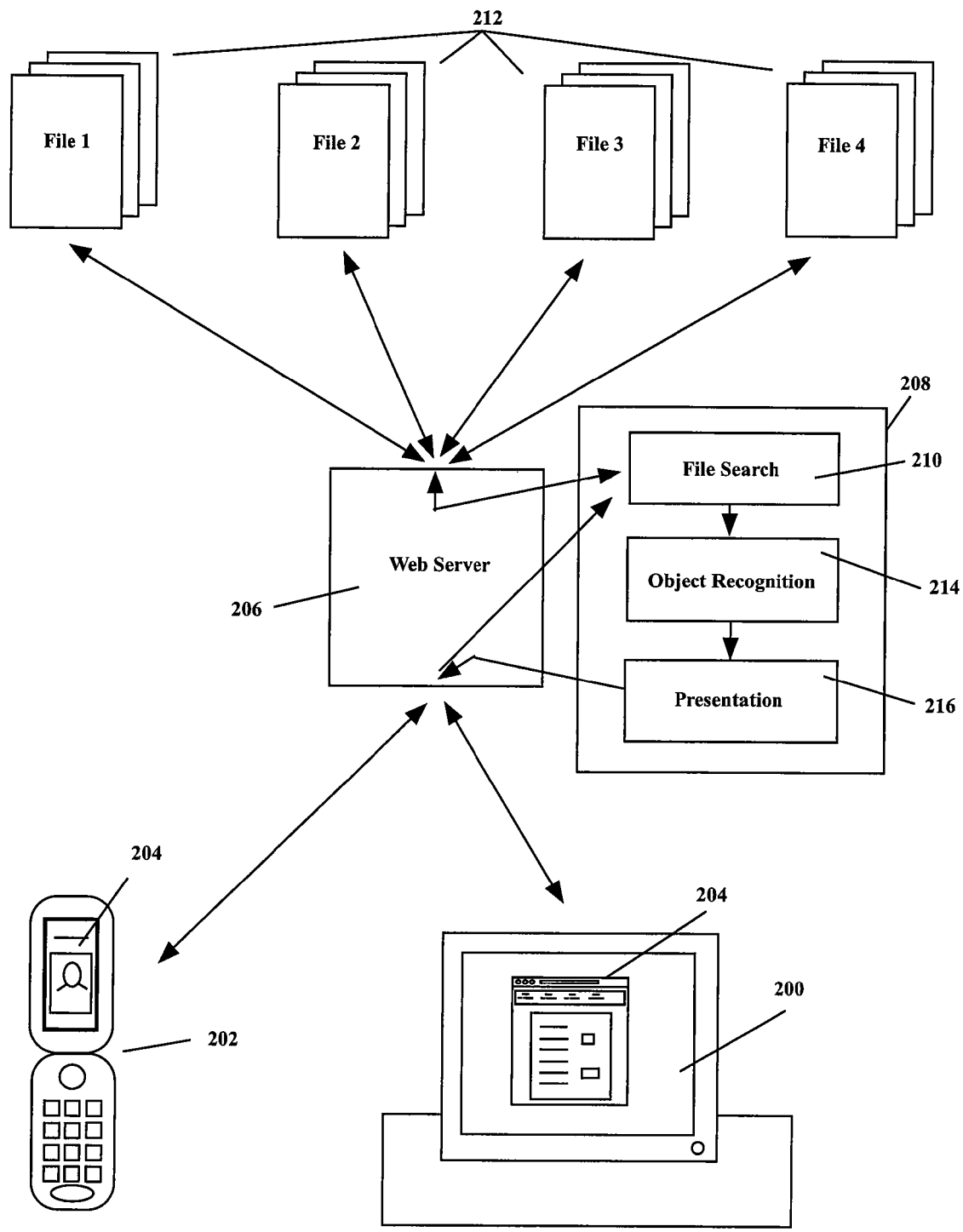
FIG. 2 depicts a block diagram of a system embodiment of the disclosure.

FIG. 2 depicts a block diagram of a system embodiment of the disclosure. A user may initiate the search from a computer terminal 200 or cell phone 202 or similar device that has a Web enabled display 204. The user may use the device to send a search query, typically a set of keywords, to the system's web server 206. This may be performed by a keyword collection means. For example, if the user is using a computer 200, then the query could be a Hyper Text Transfer Protocol (HTTP) message from a Web form served up from the Web server 206. If the user is using a cell phone 202, then the means could be the system adapted to accept a query in the form of a text message. A cell phone that has web browsing capability could also query via HTTP, in the same fashion as the computer 200. The query may then be processed by the system's processing system 208, which may include such elements as a search engine 210, object detection engine 214, and a presentation engine 216. Typically, these engines are programs on a general purpose computer, but a hardware solution is also possible. The search engine 210 in the processing system determines which files (websites) 212 on the Internet are relevant to the search query. The Web server may scan the files (or has previously scanned the files) for images. These images may be checked by the object detection engine 214 to verify if they are of the type (i.e. depicting the correct class of object) that is expected for the search. The object detection may be software or hardware designed to determine if an image file (.jpg, .gif, .bmp, etc.) contains the image of a certain type, or "class", of object. A more detailed description of this type of image identification can be found in the paper "Robust real-time Object Detection" by Paul Viola and Michael Jones (Second International Workshop on Statistical and Computational Theories of Vision—Modeling, Learning, Computing and Sampling; Vancouver, Canada, Jul. 13, 2001), the contents of which are hereby incorporated by reference. The images that are of the correct type and the results of the search (e.g. the locations of the files and sample text from the files) could then be processed by a display means, such as a display presentation engine 216, to present the user with links and images on the user's display 204. A display presentation engine 216 could be software running on a computer that instructs the web server on how to display the search results to the user. The display presentation engine could perform this by embedding the data (e.g. the URLs of the files and images) into a Hyper Text Markup Language (HTML) file that can be served up on the web server 206 to the user, who can then view the results on a Web browser. More sophisticated forms of serving up the data are possible, such as utilizing Flash, Java, Portable Document Format (PDF), or some other language/format that is known for displaying information from the Internet. If the results are to be returned to a cellular device, a conversion engine may transform them to SMS or MMS format. Alternatively, the result could be provided in the form of a "report" and offered to the user as a file to be saved on his/her own local machine.

Figure 3:
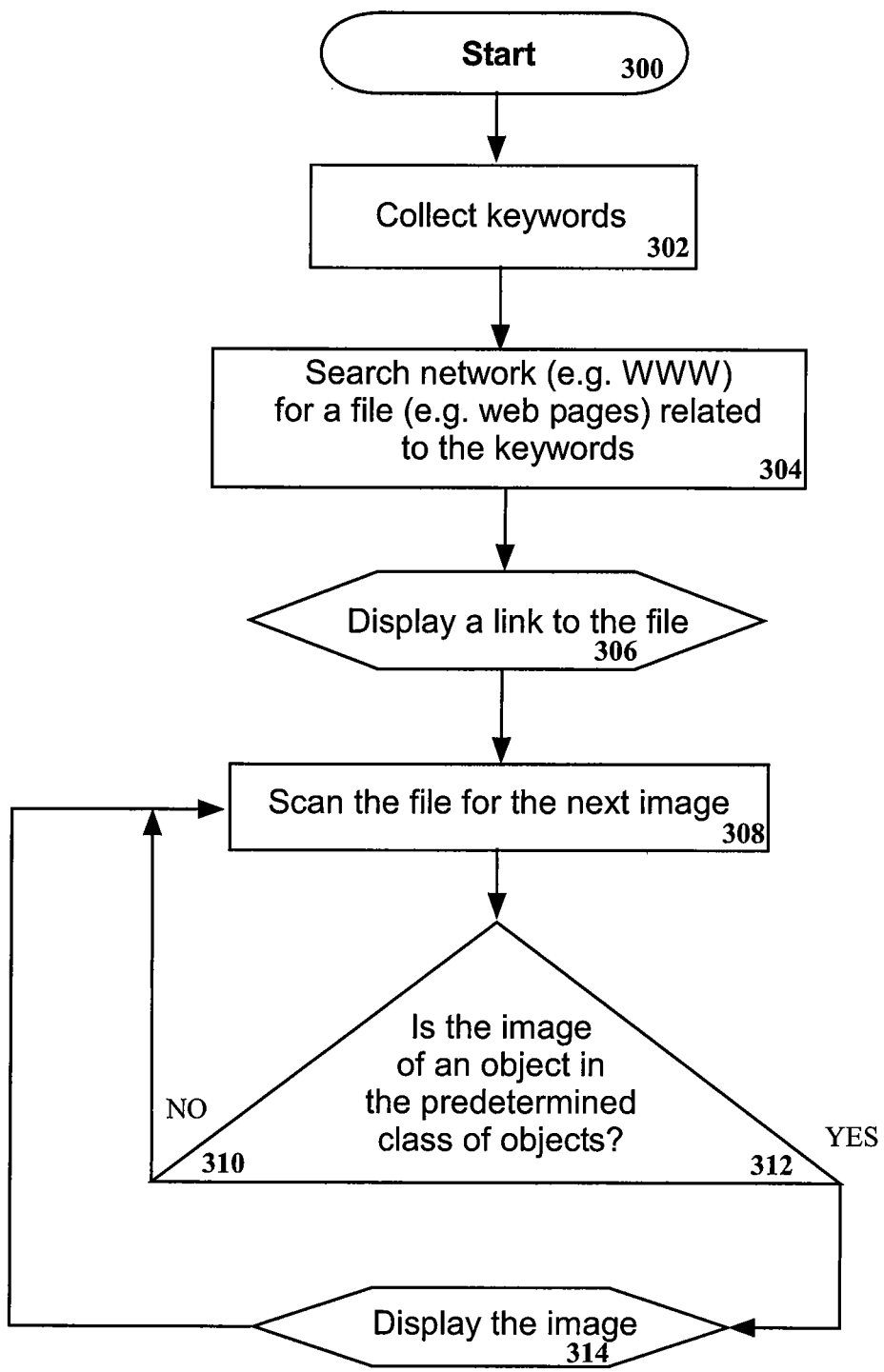
FIG. 3 depicts a flowchart of the steps an embodiment of the system could follow.

FIG. 3 is a flowchart of the steps an embodiment of the system could follow. When a user is searching for an object 300, the system may first collect from the user keywords 302 that are relevant to the object being searched for. The keywords are typically collected through a text user interface, such as a web browser form or a text message to the system. The system then may search the network 304 (e.g. Internet) for files that contain information relevant to the keywords. In use, the search might actually be performed on an index file of files previously scanned by the system. The system then goes through the files and, using ranking algorithms to determine the order in which the links to the files should be displayed, displays links to each file 306. The system scans each file for images 308. If an image is found, the system determines—for example, using a combination of analysis of the text in the <img> markup language tag and object detection software—if the image is of an object in a predetermined class of objects (e.g. people). If it is 312, then the image is displayed 314 in conjunction with the link (e.g. along side the link). If not 310, the image is not displayed. In either case 310, 312, the file is scanned for more images 308 until no more images are found. Then the image display steps 308-314 are repeated for the other files found during the search 304.

While various embodiments of the present invention have been described above, it should be understood that they have been presented by way of example, and not limitation. It will be apparent to persons skilled in the relevant art or arts that various changes in form and detail can be made therein without departing from the scope of the invention. Thus the present invention should not be limited by any of the above-described embodiments, but should be defined only in accordance with the following claims and their equivalents.

What is claimed:

1. A method for displaying to a user links to files on a network, the method comprising:
    collecting at least one keyword related to information being sought from the user using a digital interface to a search engine, said search engine being operable for crawling and indexing the network files;
    associating the at least one keyword to a class of objects, wherein the class of objects comprises a categorical noun grouping related to one or more of a pre-set object class of the search engine or an object class selected automatically by the search engine in relation to the collecting of the at least one keyword or an object class selected by the user in relation to the collecting of the at least one keyword;
    selecting the class of objects based at least on the associating the at least one keyword to the class of objects;
    searching the network files based on one or more of the collecting the keyword and the selecting class of objects for at least one file containing information related to the at least one keyword;
    upon the searching the network, wherein the searching returns a result comprising the at least one file related to the at least one keyword, the at least one file comprising at least one graphical image, performing an object recognition over the at least one graphical image;
    determining, based on the object recognition performed, whether or not the graphical image relates to an object within the selected class of objects;
    ranking the results based on a relevance related to one or more of the keyword and the performing the object recognition; and
    displaying the results for the user based on the ranking thereof, the displaying the results comprising:
        displaying, upon the performing the object recognition and determining that the graphical image relates to the selected class of objects, a representation of the graphical image based thereon; and
        displaying, in conjunction with the displayed representation, a hyperlink associated with a Web-based linking to the at least one file; or
        upon the performing the object recognition and determining that the graphical image does not relate to the selected class of objects, displaying the hyperlink associated with the Web-based linking to the at least one file, wherein the displaying the hyperlink comprises presenting the hyperlink independent of an image relating to the selected class of objects,
    wherein the displaying the graphical image of an object within the selected class of objects in conjunction with the displayed link indicates that the displayed link has a relevance to the information related to the at least one keyword link, which based on the ranking the relevance, exceeds that of one or more of the hyperlinks presented independent of an image relating to the selected class of objects.

2. The method of claim 1, wherein said object is a person and said class of objects is people.

3. The method of claim 2, further comprising:
    determining at least one identification of people referred to in the at least one file containing information related to the at least one keyword;
    using the at least one identification to search the network for at least one information specialized website that refers to said people referred to; and
    displaying to the user social network links to at least one social network.

4. The method of claim 3, wherein the links to the at least one information specialized website are links to a member page in a social network, the member page being designated for one of said people referred to.

5. The method of claim 3, wherein displaying links corresponding to each of at least one file to the user, displaying said at least one graphical image to the user, and displaying to the user social network links to the at least one social network includes placing said links corresponding to each of at least one file, said at least one graphical image, and said social network links in a report file to be presented to the user.

6. The method of claim 1, wherein:
    the user inputs the keywords via text messaging from a mobile telephonic device and all displaying is performed on said mobile telephonic device.

7. The method of claim 1, wherein the links to each of said at least one file are prioritized by relevance.

8. The method of claim 1, wherein said determining which of said at least one graphical image is an image of an object within a class of objects further includes analyzing the text of the markup language tag for said image.

9. The method of claim 1, wherein displaying links corresponding to each of at least one file to the user and displaying said at least one graphical image to the user includes placing said links and said at least one graphical image in a report file to be presented to the user.

10. The method of claim 1, wherein the class of objects is pre-set in a search engine or separately selected by the user.

11. A system for displaying to a user links to files on a network, the system comprising:
    a web server adapted for collecting at least one keyword from the user related to information being sought from the user, associating said at least one keyword to a class of objects, wherein the class of objects is a categorical noun grouping and selecting such class of objects;
    a computer adapted for searching the network within said class of objects for at least one file containing information related to the at least one keyword;

an object recognition engine, capable of determining if an image file referenced by the at least one file is an image of an object within the predetermined class of objects; and a computer and/or web server adapted for displaying text, links, and/or images related to each of said at least one file to the user, only if the images are the images of an object within the predetermined class of objects, wherein a displayed image of an object within the predetermined class of objects in conjunction with the file indicates that the link is relevant to what the user is searching for, wherein the system is operable for a process for displaying to a user links to files on a network, the process comprising the steps of:

collecting at least one keyword related to information being sought from the user using a digital interface to a search engine operable for crawling and indexing the network files;

associating the at least one keyword to a class of objects, wherein the class of objects comprises a categorical noun grouping related to one or more of a pre-set object class of the search engine or an object class selected automatically by the system or manually by the user in relation to the collecting step;

selecting the class of objects based at least on the associating step;

searching the network files based on one or more of the collecting step and the selecting step for at least one file containing information related to the at least one keyword;

upon the searching step, wherein the searching returns a result comprising the at least one file related to the at least one keyword, the at least one file comprising at least one graphical image, performing an object recognition over the at least one graphical image with the object recognition engine;

determining, based on the object recognition step performed, whether or not the graphical image relates to an object within the selected class of objects;

ranking the results based on a relevance related to one or more of the keyword and the performing the object recognition step; and displaying the results based on the ranking thereof, the displaying the results comprising:

displaying, upon the performing the object recognition with the object recognition engine and determining that the graphical image relates to the selected class of objects, a representation of the graphical image based thereon; and displaying, in conjunction with the displayed representation, a hyperlink associated with a Web-based linking to the at least one file; or upon the performing the object recognition with the object recognition engine and determining that the graphical image does not relate to the selected class of objects, displaying the hyperlink associated with the Web-based linking to the at least one file, wherein the displaying the hyperlink comprises presenting the hyperlink independent of an image relating to the selected class of objects.

12. The system of claim 11, wherein the displaying text, links, and/or images related to relevant files in priority is performed by exclusively showing text, links, and/or images related to relevant files.

13. The system of claim 11, wherein said computers and said web servers are incorporated as a single device.

14. The system of claim 11, wherein the object recognition engine is an object detection engine.

15. The system of claim 11, wherein the computer is adapted for searching text and images.

16. The method of claim 1, wherein searching the network for at least one file containing information related to the at least one keyword includes searching for text and images.

* * * * *